(12) United States Patent
de Koning et al.

(10) Patent No.: US 8,878,430 B2
(45) Date of Patent: Nov. 4, 2014

(54) TL RETROFIT LED MODULE OUTSIDE SEALED GLASS TUBE

(75) Inventors: Niels de Koning, Eindhoven (NL); Pieter Van Der Wel, Heerlen (NL); Rifat Hikmet, Eindhoven (NL); Koen Kriege, Mierlo (NL); Hans Cillessen, Deurne (NL); René Wegh, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/806,296

(22) PCT Filed: Jun. 22, 2011

(86) PCT No.: PCT/IB2011/052726
§ 371 (c)(1),
(2), (4) Date: Feb. 13, 2013

(87) PCT Pub. No.: WO2012/001584
PCT Pub. Date: Jan. 5, 2012

(65) Prior Publication Data
US 2013/0207533 A1 Aug. 15, 2013

(30) Foreign Application Priority Data
Jul. 1, 2010 (EP) ..................................... 10168134

(51) Int. Cl.
*F21V 29/00* (2006.01)
*F21V 3/00* (2006.01)
*H01L 33/50* (2010.01)
*F21K 99/00* (2010.01)
*F21V 3/04* (2006.01)
*F21V 23/00* (2006.01)
*F21Y 103/00* (2006.01)
*F21Y 101/02* (2006.01)

(52) U.S. Cl.
CPC ............. *F21V 29/004* (2013.01); *F21V 23/005* (2013.01); *Y02B 20/386* (2013.01); *F21K 9/00* (2013.01); *F21Y 2103/003* (2013.01); *F21K 9/56* (2013.01); *F21V 3/04* (2013.01); *F21Y 2101/02* (2013.01)
USPC ............. 313/501; 313/512; 362/84; 362/230; 362/294

(58) Field of Classification Search
CPC .................. H01L 33/50–33/508; H01L 33/54; H01L 27/322; H01L 23/003–23/009
USPC ........ 313/11–46, 483–487, 501; 362/84, 294, 362/230, 231
See application file for complete search history.

(56) References Cited

U.S. PATENT DOCUMENTS

2005/0029931 A1    2/2005  King et al.
2007/0132366 A1*   6/2007  Yabe et al. .................... 313/501
2007/0267976 A1*  11/2007  Bohler et al. ................. 315/112

(Continued)

FOREIGN PATENT DOCUMENTS

DE      102006037896 A1    2/2008
EP           1881259 A1    1/2008

(Continued)

*Primary Examiner* — Mariceli Santiago
(74) *Attorney, Agent, or Firm* — Yuliya Mathis

(57) ABSTRACT

This invention relates to a lighting device comprising a light generation unit (102), which comprises a light emitting diode element (105) having at least one light emitting diode (103), and a light conversion unit (104). The light conversion unit comprises an integral enclosure (110), which encloses a cavity (130), and an organic phosphor element (112) arranged within the cavity. The light generation unit further comprises a base part (114), which includes a thermally conductive material (114) thermally connected with the light emitting diode element. Light generated by the light emitting diode element of the light generation unit is output through the light conversion unit and thereby converted by the organic phosphor element.

10 Claims, 4 Drawing Sheets

(56) References Cited

U.S. PATENT DOCUMENTS

| | | | |
|---|---|---|---|
| 2007/0273274 A1* | 11/2007 | Horiuchi et al. | 313/504 |
| 2009/0086492 A1 | 4/2009 | Meyer | |
| 2009/0102357 A1 | 4/2009 | Koyama | |
| 2010/0025700 A1* | 2/2010 | Jung et al. | 257/89 |
| 2010/0164346 A1* | 7/2010 | Li et al. | 313/46 |
| 2013/0092969 A1* | 4/2013 | Hikmet et al. | 257/98 |
| 2013/0200785 A1* | 8/2013 | Yano et al. | 313/512 |

FOREIGN PATENT DOCUMENTS

| | | |
|---|---|---|
| GB | 2366610 A | 3/2002 |
| JP | 2005103700 A | 4/2005 |
| WO | 2004068183 A3 | 8/2004 |
| WO | 2009128004 A1 | 10/2009 |

* cited by examiner

TL RETROFIT LED MODULE OUTSIDE SEALED GLASS TUBE

FIELD OF THE INVENTION

The present invention relates to a lighting device comprising a light generation unit, which comprises a light emitting diode element having at least one light emitting diode, and a light conversion unit converting the generated light and comprising a phosphor element.

BACKGROUND OF THE INVENTION

LED retrofit solutions for conventional fluorescent lamps comprising a light emitting diode element (LED element) and a phosphor element are provided with a sealed enclosure enclosing a cavity with the LED element, the phosphor element and possibly other parts, for example as disclosed in JP 2005103700. However, such a structure has a limited light brightness capacity due to the limited power that can be dissipated within the cavity without damaging the LEDs.

SUMMARY OF THE INVENTION

It is an object of the present invention to provide a lighting device that alleviates the above-mentioned drawbacks of the prior art. This object is achieved by a lighting device according to the present invention as defined in claim 1.

The invention is based on an insight that by separating the light conversion unit from the light generation unit and arranging the light emitting diode element on a thermally conductive material the conditions for heat dissipation are substantially increased.

Thus, in accordance with an aspect of the present invention, there is provided a lighting device comprising a light generation unit, which comprises a light emitting diode element having at least one light emitting diode, and a light conversion unit. The light conversion unit comprises an integral enclosure, which encloses a cavity, and an organic phosphor element arranged within the cavity. The light generation unit comprises a light conversion unit support, which supports the light conversion unit, and a base part, which comprises a thermally conductive material thermally connected with the light emitting diode element. The light generated by the light generation unit is output from the light emitting diode device through the light conversion unit and thereby converted by the phosphor element. It is advantageous to use an organic phosphor element compared to using an inorganic phosphor element. On the other hand the organic phosphor element needs protection from oxygen. Therefore a sealed cavity with a controlled oxygen free atmosphere is necessary for the organic phosphor element. However, the LED element does not need such a controlled atmosphere. By thus separating the light conversion unit from the light generation unit, providing a thermally conductive material and mounting the LED element on the thermally conductive material, which act as a heat spreader, it is possible to dissipate a considerably larger amount of heat than if the LED element is enclosed in the same cavity as the phosphor element. Furthermore, the brightness of the lighting device can be substantially improved.

In accordance with an embodiment of the lighting device, the light generation unit and the light conversion unit in conjunction defines a further cavity wherein the light emitting diode element is arranged. Advantageously, properties of the further cavity can be matched with respect to the light emitting diode element.

In accordance with an embodiment of the lighting device, the light generation unit comprises a light conversion support, which includes a wall portion having a light reflector at an inner surface thereof, for reflecting impacting light generated by the light emitting diode element towards the light conversion unit. This is advantageous as regards directing the output light.

In accordance with an embodiment of the lighting device, the lighting device comprises a light guide, which is arranged between the light emitting diode element and the light conversion unit. This is another advantageous way of directing the light output.

In accordance with an embodiment of the lighting device, the organic phosphor element is a layer that has been deposited on an inner surface of the integral enclosure. This embodiment provides for a comparatively simple manufacture of the light conversion unit.

In accordance with an embodiment of the lighting device, the integral enclosure is made of glass.

In accordance with an embodiment of the lighting device, the light diode emitting element generates blue light. By means of a complementary organic phosphor element a high brightness output of, for instance, white light is obtainable.

In accordance with an embodiment of the lighting device, the light generation unit comprises a shell which is attached to the light conversion unit and to a portion of the base part extending beyond the light conversion unit, and which forms a space wherein drive electronics are arranged on the base part. Thereby the drive electronics can be advantageously separated from the rest of the structure.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
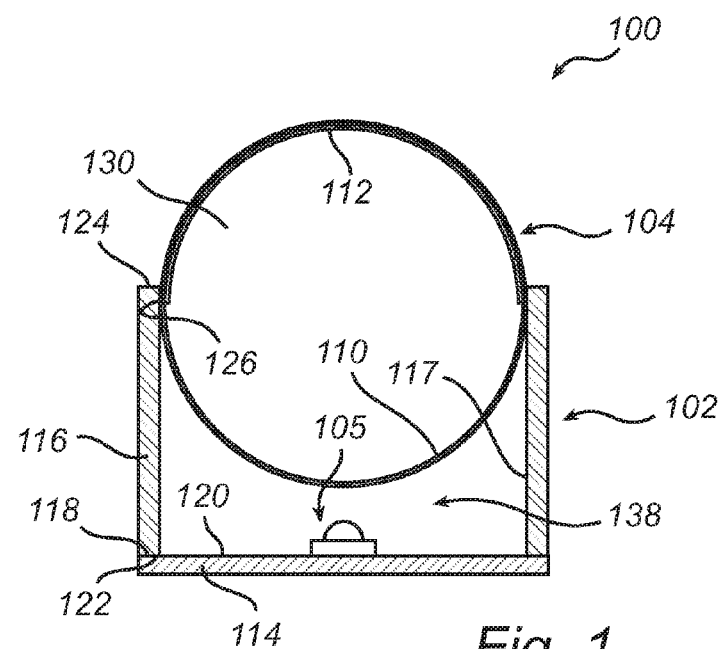
FIG. 1 is a cross-sectional view of an embodiment of a lighting device according to the present invention.
Figure 2:
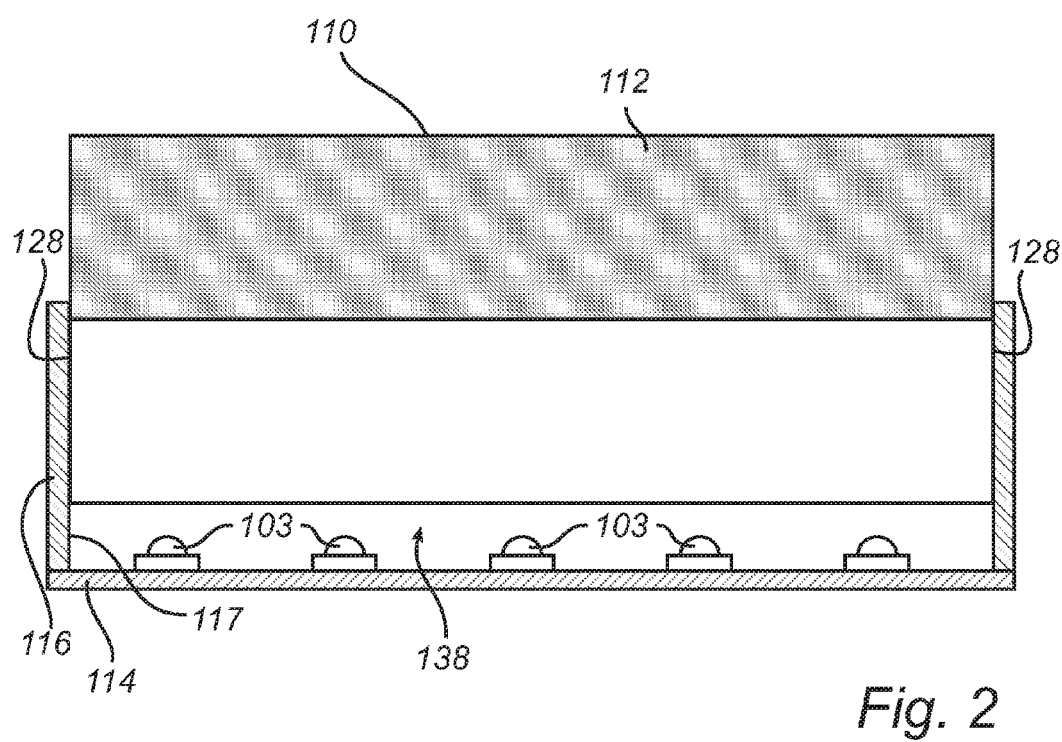
FIG. 2 is a longitudinal sectional view of the lighting device of FIG. 1.

A first embodiment of a lighting device 100 according to the present invention, as shown in FIGS. 1 and 2, comprises a light generation unit 102, and a light conversion unit 104 attached to the light generation unit 102. The light generation unit 102 comprises a light emitting diode (LED) element 105, which has several light emitting diodes (LEDs) 103. The light conversion unit 104 comprises an integral enclosure 110, consisting of a closed glass tube, enclosing a cavity 130, and an organic phosphor element 112, arranged within the cavity 130 and consisting of a layer that has been deposited on an inner surface of the glass tube 110. The organic phosphor element 112 covers at least a part of the inner surface, preferably a front half thereof, forming the final light outlet surface of the glass tube 110.

The light generation unit 102 comprises a base part 114, having a plate shape, and a light conversion unit support 116, which may be integral with the base part 114, and which constitutes a wall part 116. The wall part 116 extends perpendicularly to the base part 114 along a peripheral strip shaped edge portion 118 thereof on a front surface 120 of the base part 114 to which the wall part 116 is attached as well. Thus the wall part 116 is attached to the base part 114 at a rear edge 122 of the wall part 116, and forms a rectangular box in conjunction with the base part 114. The light conversion unit 104 is supported by the wall part 116. More particularly, the glass tube 110 is placed in the box 114, 116, with its longitudinal centre axis along the length of the box 114 and 116, such that the glass tube 110 is supported by the wall part 116 and extends into the box 114, 116 to almost half the width of the glass tube 110. The glass tube 110 is attached to a front edge 124 of the wall part 116 along a longitudinal strip shaped portion 126 of an outer surface thereof and/or at end portions 128 of the glass tube which end portions 128 are engaging the inner surface of the wall part 116. The organic phosphor element 112 covers the part of the glass tube 110 that protrudes from the box 114, 116. The base part 114 includes a thermally conductive material, and more particularly, in this embodiment, the whole base part 114 consists of a thermally conductive material, which means that it has a considerable thermal conductivity. For example the considerable thermal conductivity is obtained by manufacturing the base part in a heat conducting material such as aluminium, copper, ceramics, etc.

Due to the good heat conducting capability, the mounting of the LED element 105 directly on the thermally conductive material, and the separate light conversion unit 104, which is mounted at a distance from the LED element 105, it is possible to use more powerful LEDs 103 without causing heat damages.

The light generation unit 102 and the light conversion unit 104 forms a further cavity 138 between them. The LED element 105 is placed in that further cavity.

The interior of the closed glass tube 110 is either evacuated or filled with an inert gas, in order to protect the organic phosphor element 112 from degrading over time due to oxygen, as is understood by the skilled person.

Advantageously the LEDs 103 are inorganic LEDs generating blue light, and the organic phosphor element 112 is arranged to convert the blue light into white light.

The wall portions of the wall part 116 are provided with a reflective inner surface 117, thereby reflecting the light generated by the LED element 105.

Figure 9:
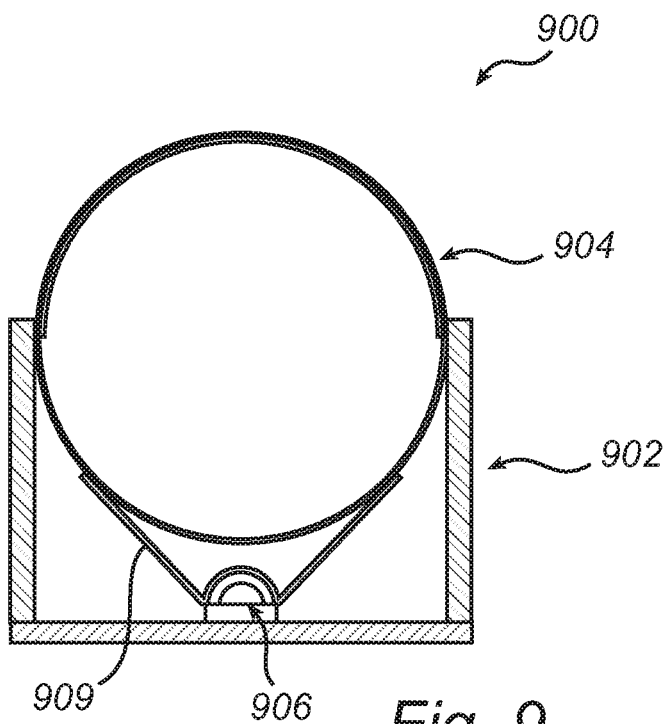

According to a modification of the first embodiment, as shown at 900 in FIG. 9, there is provided a light guide 909 comprising an optical portion covering the LED element 906, and reflective wall portions arranged opposite to each other on both sides of the LED element 906, and extending obliquely forwards into engagement with the light conversion unit 904. Thereby the light guide 909 guides the emitted light from the LED element 906 towards the light conversion unit 904.

Figure 3:
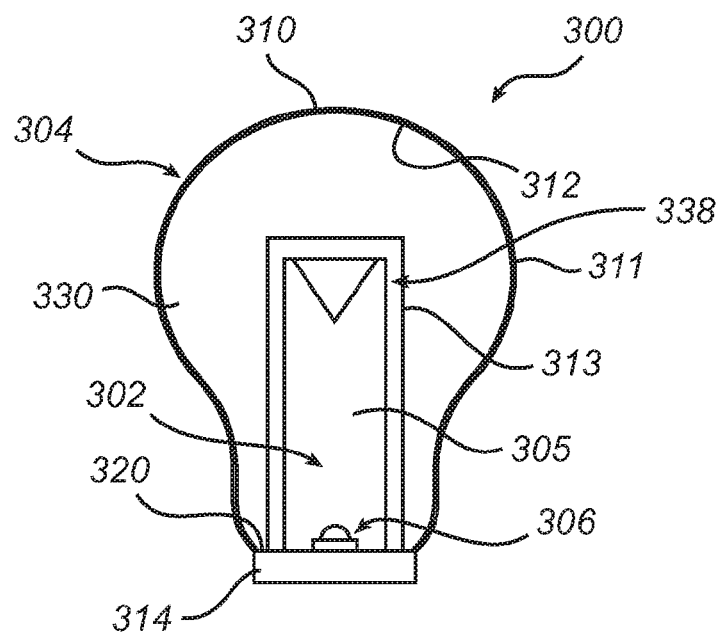
FIG. 3 is a cross-sectional view of an embodiment of a lighting device according to the present invention.

In a second embodiment of the lighting device 300, as shown in FIG. 3, the light generation unit 302 comprises a plate shaped base part 314, a LED element 306 mounted at the inner surface 320 of the base part 314, and a light guide 305, which is attached to the base part 314. The light guide 305 covers the LED element 306 in order to guide light generated thereby, and is basically post shaped extending with its longitudinal centre axis extending perpendicular to the inner surface 320 of the base part 314.

The light conversion unit 304 comprises an integral enclosure 310, consisting of a closed double-wall glass bulb, and an organic phosphor element 312. The two walls of the glass bulb 310 are integral and are arranged one enclosing the other, such that an outer wall 311 has the bulb shape, while the shape of an inner wall 313 is matched with that of the light guide 305. Thus, the inner wall 313 forms a recess in which the light guide 305 has been received. The outer and inner walls 311, 313 enclose a cavity 330, while a further cavity 338 is defined between the light generation unit 302, and more particularly the base part 314 thereof, and the light conversion unit 304, and more particularly the inner wall 313 thereof. Thus, the LED element 306 as well as the light guide 305 are placed in that further cavity 338, which has no particular restrictions as regards the atmosphere. Typically it is air. The organic phosphor element 312 consists of an organic phosphor layer that has been deposited on an inner surface of the outer wall 311 of the glass bulb 310. The glass bulb 310 has a bulb base, which is attached to the base part 314 of the light generation unit 302. Like in the first embodiment the base part 302 consists of a thermally conductive material.

For the purposes of term definition, it should be noted that the double wall definition is chosen from a general conception when viewing the glass bulb. On the other hand when viewing it from inside the cavity the glass bulb could likewise be regarded as single walled, since the walls 311, 313 form the integral enclosure 310. Similarly, the glass tube 110 of the first embodiment, when viewed from the LED element could be regarded as double walled since the generated light passes two wall portions on its way out, while from a general conception the glass tube is regarded as single walled.

Figure 4:
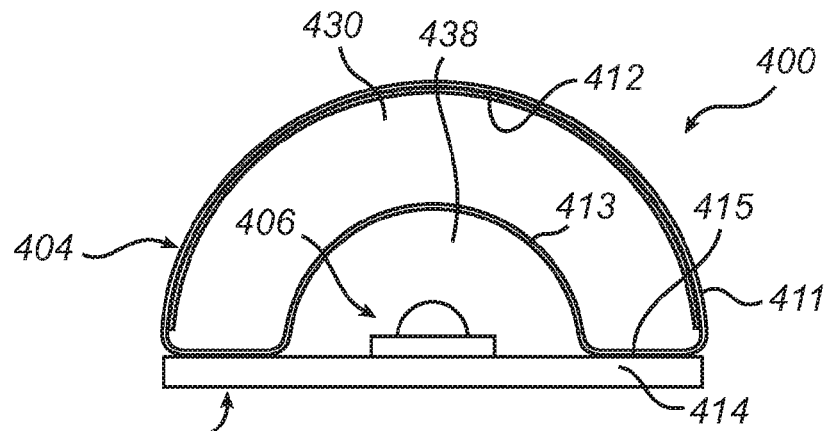
FIG. 4 is a cross-sectional view of an embodiment of a lighting device according to the present invention.
Figure 5:
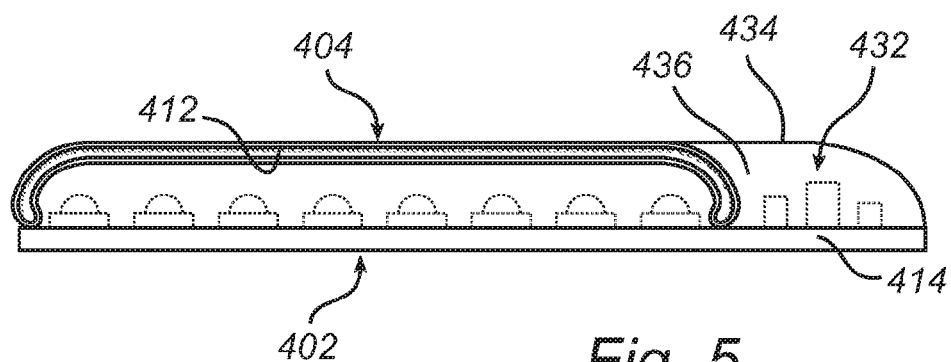
FIG. 5 is a longitudinal sectional view of the lighting device of FIG. 4.

In a third embodiment of the lighting device 400, as shown in FIGS. 4 and 5, similar to the second embodiment the lighting device 400 comprises a light generation unit 402 having a plate shaped base part 414, which consists of a thermally conductive material, and a LED element 406 arranged on the base part 414. Further the lighting device 400 comprises a light conversion unit 404 having an integral enclosure 410 enclosing a cavity 430. The integral enclosure 410 has a rainbow shaped cross-section, and comprises an outer generally semi-cylindrical wall 411, and an inner wall 413 having a central generally semi-cylindrical wall portion of a smaller diameter than the outer wall and arranged coaxially thereof, and plane side wall portions 415 extending between the central semi-cylindrical wall portion and the outer semi-cylindrical wall 411. The ends of the integral enclosure 410 are bent such that it forms an elongate bowl the rim of which is arranged on the base part 414 such that the LED element 406 is positioned in a further cavity 438 formed between the integral enclosure 410 and the base part 414.

The organic phosphor element is constituted by an organic phosphor layer 412, deposited on the inner surface of the outer semi-cylindrical wall 411.

In addition, in this embodiment, the light generation unit 402 comprises a shell 434, which is attached to the light conversion unit 404 and to an end of the outer semi-cylindrical wall 411, and which extends beyond the integral enclosure 410. The shell 434 covers an end portion of the base part 414 like the integral enclosure covers the rest of the base part 414, and forms a third cavity 436, wherein drive electronics 432 are arranged on said end portion of the base part 414.

Figure 6:
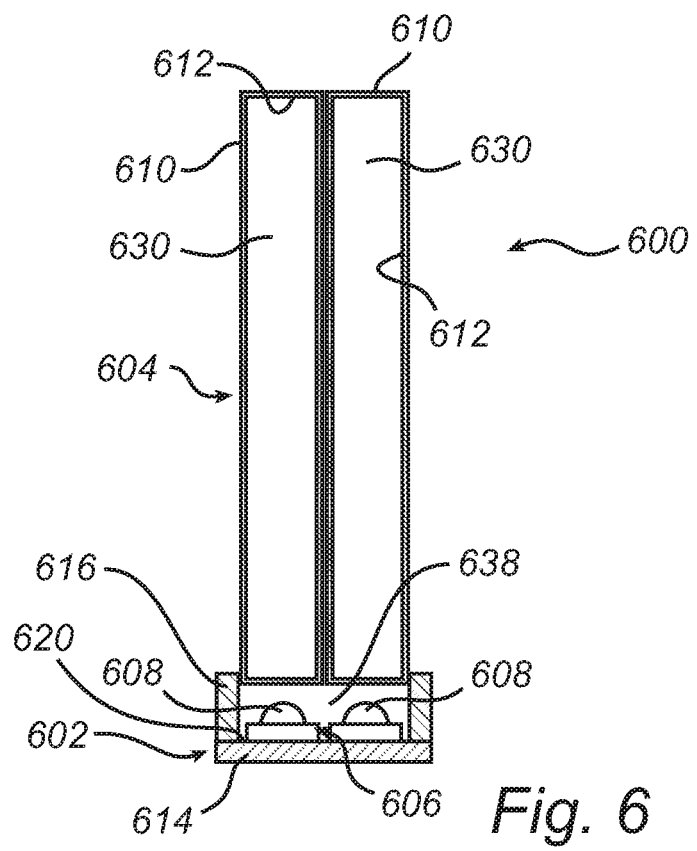
FIGS. 6-9 are cross-sectional views of embodiments of a lighting device according to the present invention.

According to a fourth embodiment thereof, as shown in FIG. 6, the lighting device 600 comprises a light generation unit 602 comprising a combination of a plate shaped base part 614 and a wall part 616, which in conjunction forms a box, similar to the box of the first embodiment. The wall part 616 constitutes a light conversion unit support supporting the light conversion unit 604 at a distance from the base part 614. A LED element 606 is arranged in the box and mounted on an inner surface 620 of the base part 614, in a further cavity 638 formed by the box 614, 616 in conjunction with the light conversion unit 604. The base part 614 includes, and more particularly consists of a thermally conductive material. The LED element includes two LEDs 608, and the light conversion unit 604 comprises two cylindrical closed glass tubes 610, each arranged in front of a respective one of the LEDs 608 with an end surface 628 facing the LED 608. That is, each glass tube 610 is arranged with its longitudinal centre axis perpendicular to the inner surface 620 of the base part 614. Thereby, the lighting device 600 forms a LED based PL-lamp structure. Each glass tube 610 encloses a cavity 630 wherein an organic phosphor element 612 is provided as a layer deposited on the inner surface of the wall of the glass tube 610, at least on the inner surface of the cylinder wall and the outer end wall thereof.

Figure 7:
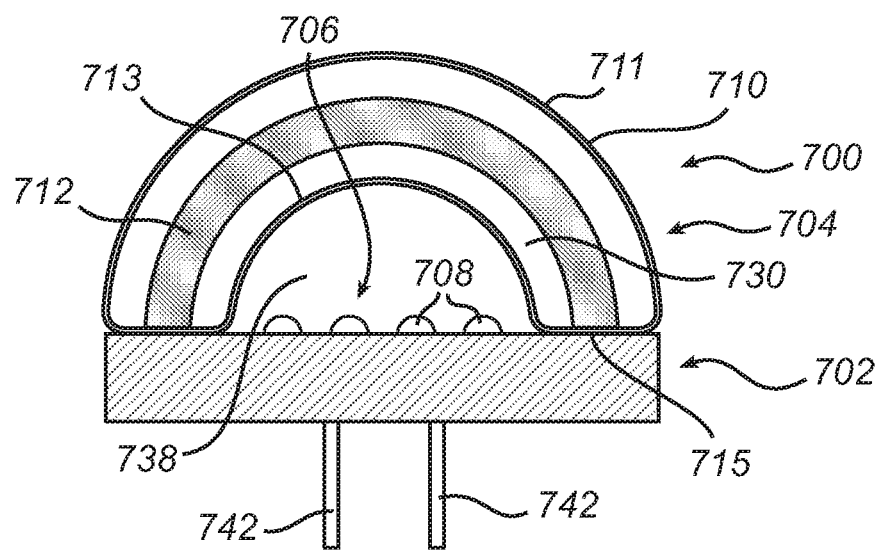
Figure 8:
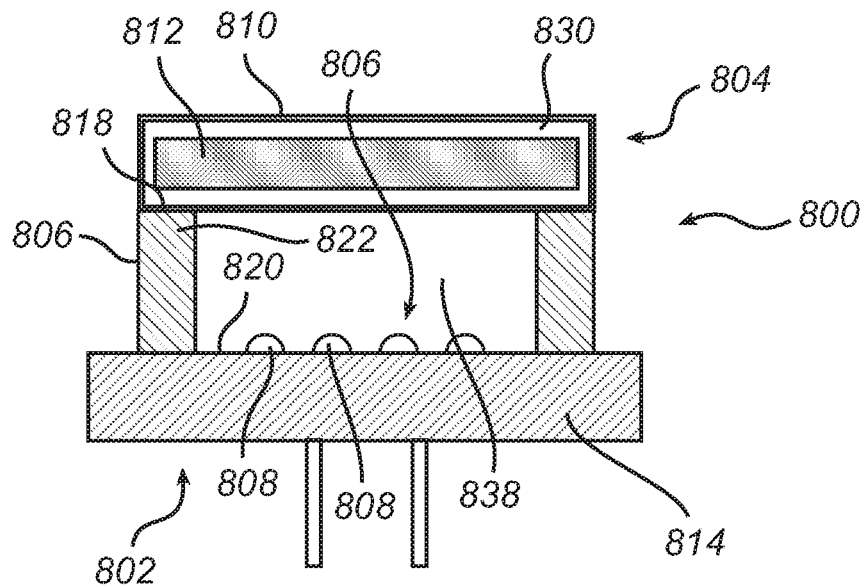

Alternatively, the organic phosphor element is provided as a separate part, as illustrated in FIGS. 7 and 8. Thus, according to a fifth embodiment thereof, as shown in FIG. 7, the lighting device 700 has a circular plate shaped light generation unit 702, and a dome shaped light conversion unit 704 arranged like a cap on the light generation unit 702. The light generation unit 702 comprises a base part 714 including a thermally conductive material. The light conversion unit 704 comprises a double walled glass structure having an inner dome shaped wall 713 and an outer dome shaped wall 711 having a larger diameter than the inner wall 713 and being connected with the inner wall via a ring shaped wall portion 715, thereby forming the integral enclosure 710 enclosing the cavity 730. The organic phosphor element 712 is arranged in the cavity 730, but in this embodiment it is a separate part anchored within the cavity instead of a surface coating on the glass wall 710. A LED element 706 comprising several LEDs 708 is mounted on the base part 714 in a further cavity 738, which is defined between the inner wall 713 of the glass structure 710 and the inner surface 720 of the base part 714. Additionally, in FIG. 7 there is shown an example of electrical terminals 742 attached to the base part 714.

Referring to FIG. 8, a sixth embodiment of the lighting device 800 has a separate organic phosphor element 812 as well. The phosphor element 812 is arranged within a brick shaped glass enclosure 810 comprised in the light conversion unit 804. The integral glass enclosure is supported by a light conversion unit support 816 comprised in the light generation unit 802 and having wall portions, which are connected to a square wall part 816. The light generation unit 802 further comprises a plate shaped base part 814, which forms a box with the wall part 816 similar to the box of the first embodiment described above. The light conversion unit, and more particularly the glass enclosure 810, is attached to an edge surface 818 of the wall part 816, which edge surface 818 is parallel with an inner surface 820 of the base part 814. Consequently, the glass enclosure 810 embodies a lid to the box 814, 816. Furthermore, the glass enclosure 810, the wall part 816, and the base part 814 define a further cavity 838 within which the LED element 806 is arranged on the inner surface of the base part 814. The wall portions of the wall part 816 are provided with a reflective inner surface 822, thereby reflecting the light generated by the LED element 806.

Above, embodiments of the lighting device according to the present invention as defined in the appended claims have been described. These should be seen as merely non-limiting examples. As understood by a skilled person, many modifications and alternative embodiments are possible within the scope of the invention.

For example, although the above embodiments are shown with a base part consisting of the thermally conductive material, it is to be noted that a portion of the base part can be formed in a thermally non-conductive material, i.e. being a poor heat conductor, as long as a desired level of heat conduction is still obtained as a whole.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A lighting device comprising a light generation unit, which comprises
   a light emitting diode element having at least one light emitting diode, and
   a light conversion unit,
   said light generation unit further comprising
   a base part, which comprises
      a thermally conductive material thermally connected with the light emitting diode element, wherein
      the light conversion unit is separated from the light generation unit and comprises a separate and sealed integral enclosure, which encloses a cavity, and an organic phosphor element arranged within the sealed integral enclosure cavity,
      said sealed cavity provided with a controlled atmosphere in order to protect the organic phosphor element from degrading over time due to oxygen;
      wherein light generated by the light emitting diode element of the light generation unit is output through the light conversion unit and thereby converted by the organic phosphor element;
      wherein the light generation unit comprises a shell which is attached to the light conversion unit and to a portion of the base part extending beyond the light conversion unit, and which forms a space wherein drive electronics are arranged on the base part.

2. The lighting device according to claim 1, wherein the light generation unit and the light conversion unit in conjunction defines a further cavity wherein the light emitting diode element is arranged.

3. The lighting device according to claim 1, wherein the light generation unit comprises a light conversion support, which includes a wall portion having a light reflector at an inner surface thereof, for reflecting impacting light generated by the light emitting diode element towards the light conversion unit.

4. The lighting device according to claim 1, wherein the lighting device comprises a light guide, which is arranged between the light emitting diode element and the light conversion unit.

5. The lighting device according to claim 1, wherein the organic phosphor element is a layer that has been deposited on an inner surface of the integral enclosure.

6. The lighting device according to claim 1, wherein the organic phosphor element is a separate element.

7. The lighting device according to claim 1, wherein the integral enclosure is made of glass.

8. The lighting device according to claim 1, wherein the light diode emitting element generates blue light.

9. A lighting device, comprising:
   a light generation unit having at least one light emitting diode element and a light output path;

a light conversion unit;

the light generation unit further having a shell attached to
- a base part which includes a thermally conductive material thermally connected with the light emitting diode element;
- a drive electronics cavity defined with the base part and the shell which forms a space wherein drive electronics are arranged on the base part;

the light conversion unit is separate from the light generation unit and includes an integral enclosure defining a sealed cavity and an organic phosphor element arranged within the cavity;

the light conversion unit in a light output path of the light generation unit;

the sealed cavity defined by the light conversion unit having a controlled atmosphere in order to protect the organic phosphor element from degrading over time due to oxygen;

wherein light generated by the light emitting diode element of the light generation unit is output through the light conversion unit and thereby converted by the organic phosphor element.

10. A lighting device, comprising:

a light generation unit having a light emitting diode element and a base part, the light generation unit further having a shell abutting the light conversion unit and the base part forming a space wherein drive electronics are arranged;

a light conversion unit in optical connectivity with the light generation unit;

said light generation unit having a base part which includes a thermally conductive material thermally connected with the light emitting diode element;

the light conversion unit forming a separate sealed structure from the light generation unit and having a sealed integral enclosure which encloses a cavity, and an organic phosphor element arranged along at least a portion of the inner wall of the cavity;

said cavity of the light conversion unit provided with a controlled atmosphere by the sealed integral enclosure which protects the organic phosphor element from degrading over time;

light generated by the light emitting diode element of the light generation unit is output through the light conversion in optical connectivity therewith and thereby converted by the organic phosphor element in the sealed integral enclosure.

\* \* \* \* \*